United States Patent [19]

Fujiwara et al.

[11] Patent Number: 4,779,491
[45] Date of Patent: Oct. 25, 1988

[54] AUTOMATIC TRANSMISSION CONTROL SYSTEM

[75] Inventors: Takuji Fujiwara; Tatsutoshi Mizobe, both of Hiroshima, Japan

[73] Assignee: Mazda Motor Corporation, Japan

[21] Appl. No.: 29,724

[22] Filed: Mar. 24, 1987

[30] Foreign Application Priority Data

Mar. 25, 1986 [JP] Japan .................. 61-66556

[51] Int. Cl.⁴ ............................................. B60K 41/16
[52] U.S. Cl. ........................................ 74/868; 74/867
[58] Field of Search ................................ 74/867, 868

[56] References Cited

U.S. PATENT DOCUMENTS

| | | | |
|---|---|---|---|
| 3,842,693 | 10/1974 | Oberpichler | 74/868 X |
| 4,274,307 | 6/1981 | Iwanaga et al. | 74/868 X |
| 4,324,154 | 4/1982 | Iwanaga et al. | 74/867 X |
| 4,334,441 | 6/1982 | Iwanaga et al. | 74/868 |
| 4,445,401 | 5/1984 | Ishimaru | 74/868 X |
| 4,628,774 | 12/1986 | Iwanaga | 74/867 |

FOREIGN PATENT DOCUMENTS 56-156543  3/1981  Japan .
0081554  5/1985  Japan .................. 74/868

*Primary Examiner*—Dirk Wright
*Attorney, Agent, or Firm*—Gerald J. Ferguson, Jr.

[57] ABSTRACT

In an automatic transmission, a second brake is engaged when the transmission is in second and is released when the transmission is in third and first. The second brake is controlled by a hydraulic actuator. Application of the hydraulic pressure to the hydraulic actuator of the second brake is limited upon upshift from first to second so that the hydraulic pressure is gently applied to the hydraulic actuator. The limitation of application of the hydraulic pressure is nullified upon downshift from third to second.

10 Claims, 3 Drawing Sheets

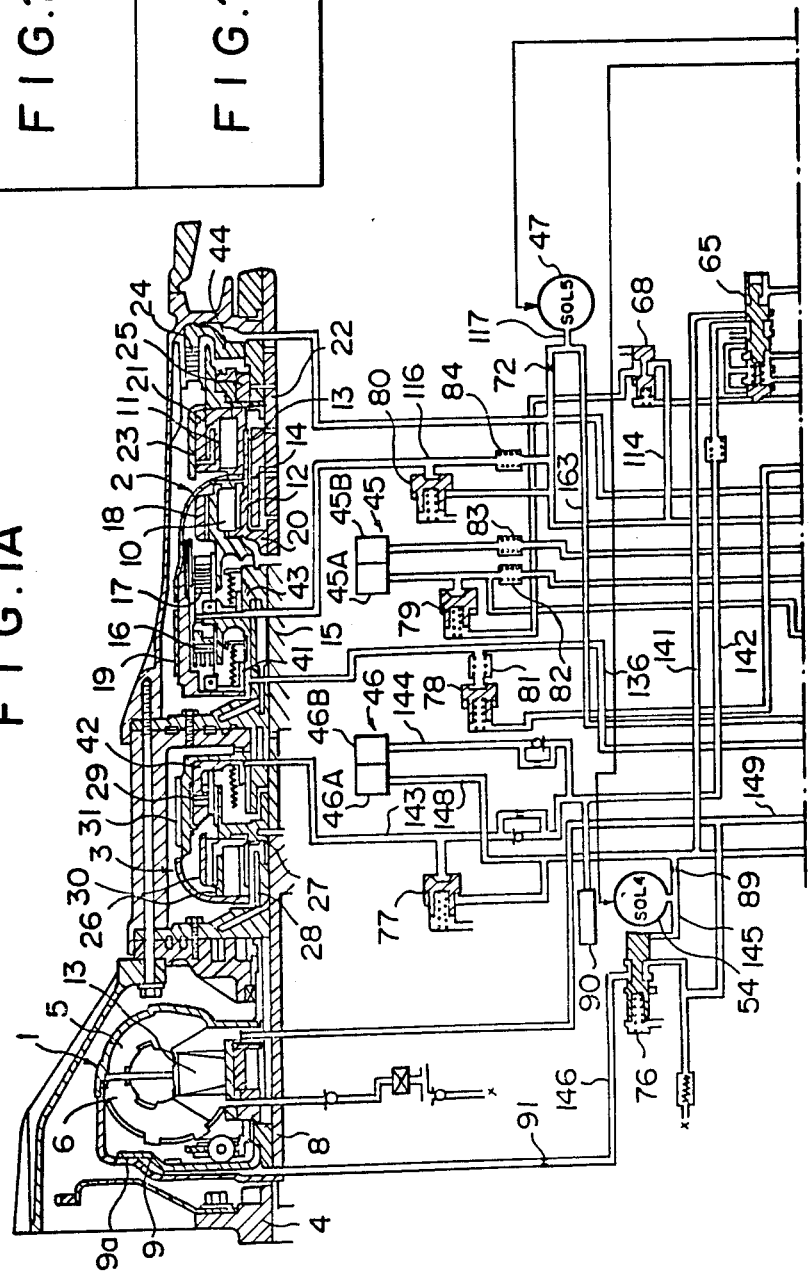

4,779,491

AUTOMATIC TRANSMISSION CONTROL SYSTEM

BACKGROUND OF THE INVENTION

1. Field of the Invention

This invention relates to an automatic transmission control system.

2. Description of the Prior Art

An automatic transmission is provided with a plurality of frictional members for selecting gear speeds, and the transmission is shifted into a desired gear speed by suitably controlling the frictional members. In some types of automatic transmissions, one of a pair of frictional members is caused to engage and the other is caused to disengage when the transmission is shifted down. For example, when the transmission is in third in D (drive) range (first to fourth), a front clutch is engaged and a second brake is disengaged, and when the transmission is shifted down from third to second, the front clutch is caused to disengage and the second brake is caused to engage. In the hydraulic pressure control system for the front clutch and the second brake, the front clutch and the second brake generally have the hydraulic pressure supply system and the hydraulic pressure release system in common. That is, hydraulic pressure for engaging the front clutch is used for disengaging the second brake, and the drain passage for disengaging the front clutch is used as the drain passage for draining second brake disengaging hydraulic pressure and engaging the second brake.

In the automatic transmission in which downshift is controlled in such a manner, shift shock can occur if the frictional member for selecting the gear speeds is not operated in time. For example, when the transmission is shifted down from third to second in D range, the turbine rpm of the torque converter is increased in response to disengagement of the front clutch from $N_3$, the converter rpm when the transmission is in third, to $N_2$, the converter rpm when the transmission is in second, by the rpm corresponding to the difference between the gear ratios in third and second. Accordingly, if engagement of the second brake is just completed at the time the turbine rpm reaches the rpm $N_2$, the downshift can be smoothly effected and less shift shock is generated. On the other hand, the second brake is engaged in second and disengaged in first, and accordingly, the second brake must be caused to engage when the transmission is shifted up from first to second. Shift shock is apt to occur also when the transmission is shifted up from first to second, and it has been known, as disclosed in Japanese Unexamined Patent Publication No. 59-183160, to cause the second brake to smoothly engage in order to prevent occurrence of shift shock by providing an accumulator on the hydraulic pressure supply side of the actuator of the second brake and by gently supplying hydraulic pressure to the accumulator through a throttling valve. However, if the second brake is caused to engage by gently supplying hydraulic pressure to the accumulator through the throttling valve when the transmission is shifted down from third to second, engagement of the second brake delays to elongate the time the transmission is in neutral, and the turbine rpm exceeds the rpm $N_2$ at the end of the downshift, thereby causing shift shock.

SUMMARY OF THE INVENTION

In view of the foregoing observations and description, the primary object of the present invention is to provide an automatic transmission control system in which engaging timing of a frictional member can be controlled to meet different requirements in different shift patterns such as the engaging timing of the second brake for downshift from third to second and that of the second brake for upshift from first to second.

In accordance with the present invention, there is provided an automatic transmission control system for controlling an automatic transmission comprising a torque convertor having an input member connected to the engine output shaft and an output member connected to a multiple stage transmission gear mechanism adapted to provide a plurality of gear speeds, and a shifting means for shifting the gear speed, the shifting means having a plurality of frictional members, a plurality of hydraulic actuators for actuating the frictional members and a plurality of valve means which are controlled according to the vehicle operating condition to control application of hydraulic pressure from a hydraulic pressure source to the hydraulic actuators, said shifting means being adapted to shift the gear speed at least among a low gear speed, an intermediate gear speed and a high gear speed, a predetermined one frictional member out of said plurality of frictional members being released in the low gear speed and the high gear speed and engaged in the intermediate gear speed, and the predetermined one frictional member being engaged and released by a predetermined one hydraulic actuator out of said plurality of hydraulic actuators, wherein the improvement comprises a first control means which limits application of the hydraulic pressure to said predetermined one hydraulic actuator so that the hydraulic pressure is gently applied to the predetermined one hydraulic actuator upon upshift from the low gear speed to the intermediate gear speed, and a second control means which operates upon downshift from the high gear speed to the intermediate gear speed to nullify the limitation of application of the hydraulic pressure to said predetermined one hydraulic actuator.

BRIEF DESCRIPTION OF THE DRAWINGS

FIG. 1, divided into FIGS. 1A and 1B, is a cross-sectional view showing an automatic transmission provided with a control system in accordance with an embodiment of the present invention.

DESCRIPTION OF THE PREFERRED EMBODIMENT

Figure 1B:
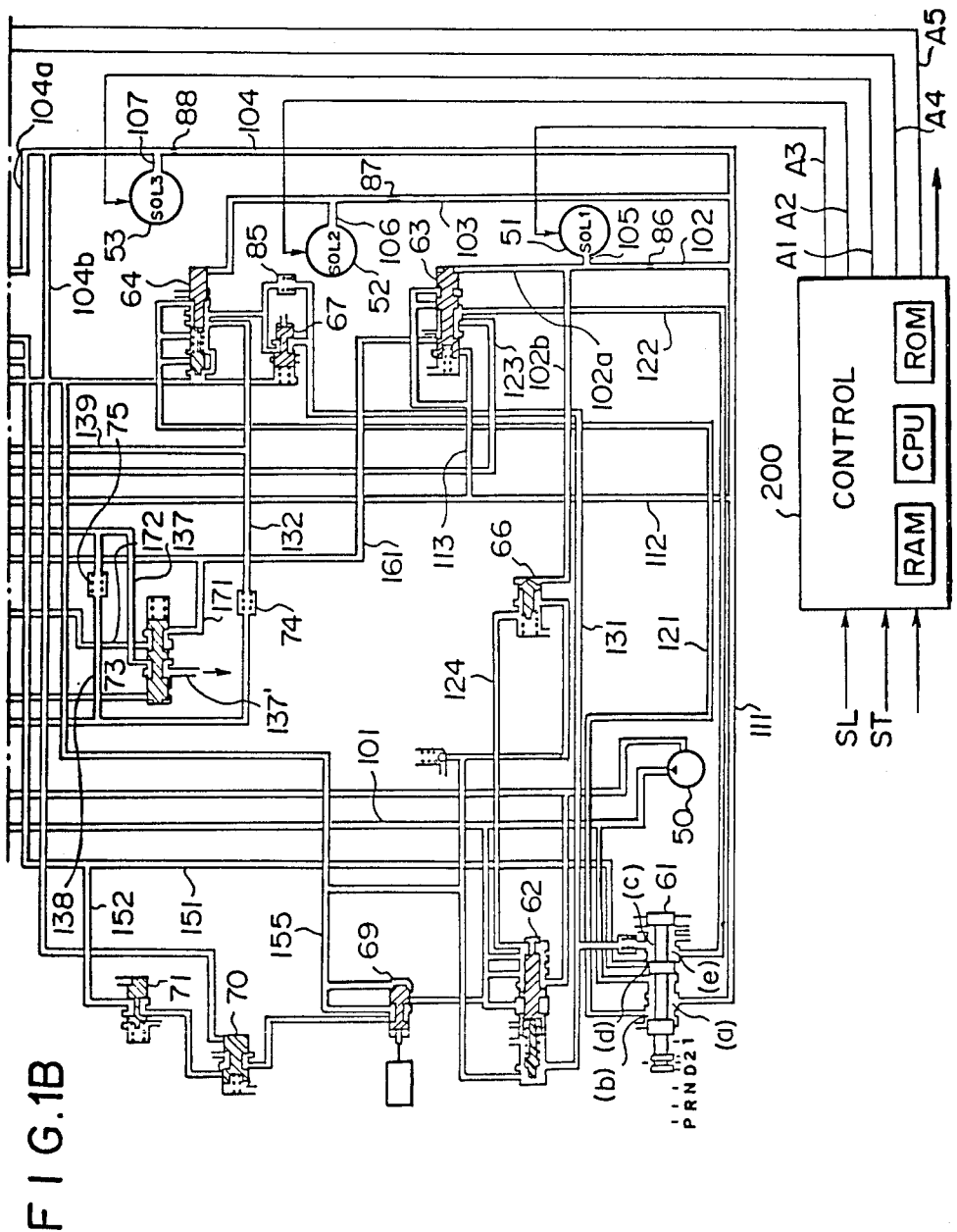

In FIG. 1, an automatic transmission comprises a hydraulic torque converter 1, a multiple stage transmission gear mechanism 2, and a planetary gear type overdrive transmission mechanism 3 arranged between the torque converter 1 and the multiple stage transmission gear mechanism 2.

The torque converter 1 has a pump 5 connected to an engine output shaft 4, a turbine 6 provided facing the pump 5 and a stator 13 disposed between the pump 5 and the turbine 6. A converter output shaft 8 is connected to the turbine 6. A lock-up clutch 9 is provided between the converter output shaft 8 and the pump 5. The lock-up clutch 9 is normally urged into engagement to lock up the engine output shaft 4 to the converter output shaft 8 under the pressure of hydraulic fluid which circulates in the torque converter 1, and is released by a disengaging hydraulic pressure which is supplied to its pressure chamber 9a from an external pressure source.

The multiple stage transmission gear mechanism 2 has a front planetary gear unit 10 and a rear planetary gear unit 11. The front planetary gear unit 10 has a sun gear 12 connected with a sun gear 13 of the rear planetary gear unit 11 by way of a connecting rod 14. The gear mechanism 2 has an input shaft 15 connected through a front clutch 16 with the connecting rod 14 and through a rear clutch 17 with an internal gear 18 of the front planetary gear unit 10. A second brake 19 is provided between the connecting rod 14 or the sun gears 12 and 13 of the gear units 10 and 11, and a casing of the transmission. The gear mechanism 2 also has an output shaft 22 connected with a planetary carrier 20 of the front planetary gear unit 10 and an internal gear 21 of the rear planetary gear unit 11. The rear planetary gear unit 11 has a planetary carrier 23, and there are provided between the planetary carrier 23 and the transmission casing a low and reverse brake 24 and a one-way clutch 25.

The multiple stage transmission gear mechanism 2 is of a known type and can provide three forward speeds and one reverse by selectively actuating the front clutch 16, the rear clutch 17, the second brake 19 and the low and reverse brake 24 by a hydraulic actuator as will be described later.

The planetary gear type over-drive transmission mechanism 3 includes planetary gears 26, a planetary carrier 27 rotatably carrying the planetary gears 26, and a sun gear 28 engaged with an internal gear 30 by way of a direct connection clutch 29. An over-drive brake 31 is provided between the sun gear 28 and the transmission casing. The internal gear 30 is connected with the input shaft 15 of the multiple stage transmission gear mechanism 2.

The planetary gear type over-drive transmission mechanism 3 connects the convertor output shaft 8 and the input shaft 15 of the transmission gear mechanism 2 directly when the direct connection clutch 29 engages and the overdrive brake 31 is released, and provides an over-drive connection between the shafts 8 and 15 when the brake 31 is engaged and the clutch 29 is disengaged.

In this transmission, when the driver operates the selector lever to move a manual valve 61 (to be described later), the frictional members (clutches and brakes) of the multiple stage transmission gear mechanism 2 and the overdrive transmission mechanism 3 are selectively operated to shift the transmission to the gear speed selected by the selector lever. The relation between the conditions of the frictional members and the gear speeds are as shown in the following table.

TABLE 1

| RANGE | | FRICTIONAL MEMBER | | | | | | | |
|---|---|---|---|---|---|---|---|---|---|
| | | REAR CLUTCH (17) | FRONT CLUTCH (16) | LOCK-UP CLUTCH (9) | DIRECT CONNECTION CLUTCH (29) | LOW AND REVERSE CLUTCH (24) | SECOND BRAKE (19) | OVERDRIVE BRAKE (31) | ONE-WAY CLUTCH (25) |
| P | | | | | O | | | | |
| R | | | O | | O | O | | | |
| N | | | | | O | | | | |
| D | 1 | O | | | O | | | | O |
| | 2 | O | | O | O | | O | | |
| | 3 | O | O | O | O | | | | |
| | 4 | O | O | O | | | | O | |
| 2 | | O | | | O | | O | | |
| 1 | 1 | O | | | O | O | | | |
| | 2 | O | | | O | | O | | |

The hydraulic control circuit for controlling the frictional members has an oil pump 50. Hydraulic oil discharged from the pump 50 is introduced into the manual valve 61 by way of a pressure line 101 after the oil pressure is adjusted by a pressure regulating valve 62. The manual valve 61 has a plunger which can be selectively positioned in one of shift positions 1, 2, D, N, R and P. The manual valve 61 has five ports a to e. The port a is communicated with the pressure line 101, when the manual valve 61 is positioned in any one of the positions 1, 2 and D. The port b is communicated with the pressure line 101 when the manual valve 61 is in either the position 2 or D. The port c is communicated with the pressure line 101 when the manual valve 61 is in the position R. The port d is communicated with the pressure line 101 when the manual valve 61 is in any one of the positions 1, 2 R and P. The port e is communicated with the pressure line 101 when the manual valve 61 is in either the position 1 or R.

The port a is communicated with a line 111. The line 111 is branched into first to third pilot lines 102, 103 and 104. The first pilot line 102 is provided with a 1-2 shift solenoid valve 51 for controlling a 1-2 shift valve 63 and a throttling valve 86. The second pilot line 103 is provided with a 2-3 shift solenoid valve 52 for controlling a 2-3 shift valve 64 and a throttling valve 87. The third pilot line 104 is provided with a 3-4 shift solenoid valve 53 for controlling a 3-4 shift valve 65 and a throttling valve 88. When the solenoid valves 51, 52 and 53 are energized (ON), drain lines 105, 106 and 107 for the respective pilot lines 102, 103 and 104 are closed, and pilot pressure is established in each pilot line, whereby the shift valves 63, and 65 are moved from an OFF-position (the rightmost position) to an ON-position (the leftmost position) to open or close hydraulic circuits of the frictional members related thereto. The relations between the gear speeds and the condition of the solenoids are shown in the following table.

TABLE 2

| | solenoid | | |
|---|---|---|---|
| gear speed | 1-2 shift solenoid valve | 2-3 shift solenoid valve | 3-4 shift solenoid valve |
| 1 | off | off | off (on) |
| 2 | on | off | off (on) |
| 3 | on | on | off |
| 4 | on | on | on |

Though the 3-4 shift solenoid valve 53 is off when the transmission is to be in first and second in D-range, it is on when the transmission is to be in first and second in 1-range and 2-range as shown in brackets in Table 2. This is for loading a backup control valve 70 (to be described later) with a pilot pressure by energizing the 3-4 shift solenoid valve 53 in 1-range and 2-range.

The first pilot line 102 is branched into first and second branch lines 102a and 102b downstream of the 1-2 shift solenoid valve 51. The first branch line 102a is communicated with the right end portion (the pilot pressure receiving portion) of the 1-2 shift valve 63. The second branch line 102b is communicated with the right end portion (the pilot pressure receiving portion) of a cutback valve 66.

The line pressure is applied to opposite end portions of the 1-2 shift valve 63 by way of a line 112 branching off from the line 111 and by way of a line 113 further branching off from the line 112. Further, the line pressure is applied to an intermediate portion of the 1-2 shift valve 63 by way of a line 122 communicating with the port e of the manual valve 61. The line 122 is communicated with a line 123 when the 1-2 shift valve 63 is off, that is, when the valve 63 is in the position for first. The line 123 is connected to a low and reverse brake actuator 44. On the other hand, the line 113 is communicated with a line 161 when the 1-2 shift valve 63 is on, that is, when the valve 63 is in the position for the gear speeds other than first. The line 161 is connected to the applying side 45A of a second brake actuator 45 by way of a one-way throttling valve 82. An accumulator 79 is provided in the line 161 near the actuator 45 and the back pressure of the accumulator 79 is controlled by a reducing valve 68. A line 171 branches off from the line 161 and is communicated with a line 172 by way of a 3-2 timing valve 73. The line 172 is communicated with the applying side 45A of the second brake actuator 45.

The 2-3 shift valve 64 is turned on and off by a pilot pressure applied through the line 103 connected to the right end portion thereof. To the 203 shift valve 64 are connected a line 121 communicated with the port b of the manual valve 61 and a line 131 communicated with the port c of the manual valve 61.

When the 2-3 shift valve 64 is on (the position for third and fourth), the line 121 is communicated with a line 132, and when the 2-3 shift valve 64 is off (the position for third and second), the line 131 is communicated with the line 132 instead of the line 121. To the line 131 are connected in parallel a reducing valve 67 and a one-way orifice 85.

The downstream side portion of the line 132 branches into a line 136 connected to a front clutch actuator 41 and line 138 connected to the releasing side 45B of the second brake actuator 45. The line 132 is provided at a portion upstream of the junction of the lines 136 and 138 with a one-way orifice 74 for throttling hydraulic oil flowing toward the junction. The line 138 is provided at a portion immediately downstream of the junction of the lines 136 and 138 with a check valve 75 for preventing hydraulic oil from flowing from the side of the second brake actuator 45 to the side of the 2-3 shift valve 64. To a portion of the line 138 downstream of the check valve 75 is connected a line 137 provided with the 3-2 timing valve 73.

The 3-2 timing valve 73 has a spool which is displaced rightward under the pilot pressure imparted to the left end portion thereof, and breaks the communications between the line 137 and a drain 137' and between the lines 171 and 172. The pilot pressure receiving portion or the left end portion of the 3-2 timing valve 73 is communicated with the line 112 by way of a line 163. A constriction 72 is provided at the junction of the lines 163 and 112, and a drain line 117 is connected to the line 163. A timing control solenoid valve 47 is provided in the drain line 117 and a predetermined pilot pressure is established in the line 163 when the solenoid valve 47 is energized. A one-way orifice 83 is provided in the line 138 downstream of the junction of the line 137 to the line 138.

An accumulator 78 is connected to the line 136 by way of a one-way orifice 81 for throttling hydraulic oil flowing out from the accumulator 78. The back pressure of the accumulator 78 is controlled by the reducing valve 67 through a line pressure applied to the accumulator 78 by way of a line 139 branching off from the line 132.

The third pilot line 104 branches at a portion downstream of the 3-4 shift solenoid valve 53 into first and second branch lines 104a and 104b. The first branch line 104a is communicated with the 3-4 shift valve 65 at the right end portion of the valve 65, and the second branch line 104b leads the pilot pressure to a backup control valve 70 (to be described later).

To an intermediate portion of the 3-4 shift valve 65 is connected a line 141 branching off from the pressure line 141. The line 141 is communicated with a line 142 when the 3-4 shift valve 65 is off (the position for the gear speeds other than fourth). The downstream end portion of the line 142 branches into a line 143 communicated with a direct clutch actuator 42 and a line 144 communicated with the releasing side 46B of an overdrive brake actuator 46. A hydraulic pressure switch 90 is provided in the line 142 upstream of the junction of the lines 143 and 144. Further, an accumulator 77 is provided in the line 143. Further, the applying side 46A of the over-drive brake actuator 46 is communicated with the pressure line 101 by way of a line 148.

To the left end portion of the 3-4 shift valve 65 is connected a line 151 communicated with the port d of the manual valve 61. The 3-4 shift valve 65 has a spool which is positively held in the off-position by the line pressure applied thereto through the line 151 in the ranges other than D-range. A line 152 branches off from the line 151 and is communicated with a vacuum throttling valve 69. In the line 152 is provided a throttle backup valve 71 upstream of the backup control valve 70 in series therewith. The throttle backup valve 71 applies to the vacuum throttle valve 69 the line pressure established in the line 152 in 1-range and 2-range to drive, by way of the vacuum throttle valve 69, the pressure regulating valve 62 to increase the line pressure. The backup control valve 70 is disposed between the throttle backup valve 71 and the vacuum throttling valve 69, and opens the line 152 to permit the throttle backup valve 71 to increase the line pressure when the pilot pressure is established in the second branch line 104b, that is, when the 3-4 shift solenoid valve 53 is turned on.

The line 112 is connected at a portion upstream of the constriction 72 to a line 116 with which a rear clutch actuator 43 is communicated. The line 116 is provided with an accumulator 80 and a one-way orifice 84. A line 114 branching off from the line 112 is provided with the reducing valve 68 for controlling the back pressure of the accumulator 79.

A line 149 is communicated with the pressure chamber 9a of the lock-up clutch 9 by way of a line 146 provided with a lock-up valve 76 and a constriction 91.

A pilot line 145 for the lock-up valve 76 is provided with a constriction 89 and a lock-up solenoid valve 54, and the lock-up clutch 9 is disengaged when the lock-up solenoid valve 54 is energized to establish the pilot pressure in the pilot line 145 to drive the lock-up valve 76 to communicate the lines 146 and 149. In this particular embodiment, the lock-up clutch 9 is engaged only in first to third in D-range.

The hydraulic control circuit is controlled by a control circuit 200 which may be a one-chip microcomputer and comprises an input/output section, a random-access memory RAM, a read-only memory ROM and a central processing unit CPU. Various signals representing conditions of the engine are input into the control circuit 200 from sensors provided in predetermined positions. For example, a load signal SL is input into the control circuit 200 from an engine load sensor which detects the engine load by way of the throttle opening and a turbine rpm signal ST (or a vehicle speed signal) is input into the control circuit 200 from a turbine rpm sensor. The CPU detects the vehicle operating condition by way of the signals, and determines the gear speed and then outputs control signals for driving the solenoid valves to shift the transmission into the determined gear speed. That is, the shift solenoid valves 51, 52 and 53, the lock-up solenoid valve 54 and the solenoid valve 47 for timing control are selectively turned on and off according to the gear speed determined by the CPU in the control pattern shown in table 2 under the control of the control signals A1, A2, A3, A4 and A5 output from the CPU. Then the frictional members are operated in the pattern shown in table 1 to shift the transmission into the determined gear speed.

In this embodiment, the engaging timing of the second brake 19 when the transmission is shifted down from third to second in D-range and that when the transmission is shifted up from first to second in D-range are controlled to prevent occurrence of shift shock due to improper engaging timing of the second brake 19.

Figure 2:
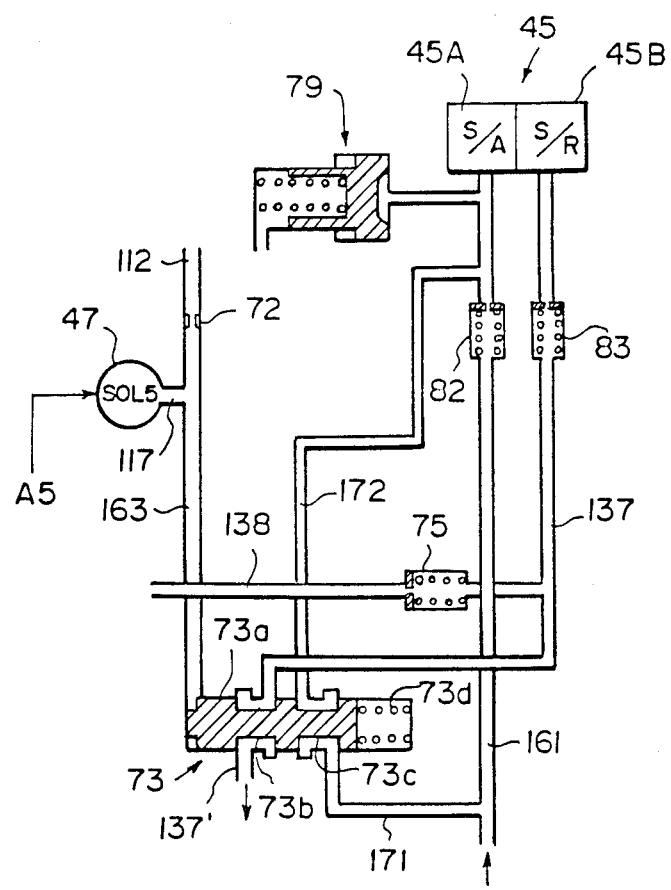
FIG. 2 is an enlarged view of a part of FIG. 1.

Since the general operation of the control circuit 200 is known, only a part of the operation of the control circuit 200 related to the present invention will be described, hereinbelow. FIG. 2 shows a part of the hydraulic control circuit shown in FIG. 1 for controlling the line pressure applied to the second brake actuator 45.

The operation of the second brake upon upshift from first to second will be described first, hereinbelow. When the transmission is in first, the solenoid valve 47 is off under the control of the control signal A5 to open the drain line 117, and accordingly, the pressure in the line 163 which forms the pilot pressure of the 3-2 timing valve 73 is zero. Accordingly, the spool 73a of the 3-2 timing valve 73 is moved leftward to the position shown in FIG. 2 under the force of the spring 73d so that the lines 137 and the 137' are communicated with each other by way of a spool groove 73b and the lines 171 and 172 are communicated with each other by way of a spool groove 73c. Since the line 137' is directly communicated with the drain side, no hydraulic pressure is imparted to the releasing side 45B of the second brake actuator 45. Further, the 1-2 shift solenoid valve 51, the 2-3 shift solenoid valve 52 and the 3-4 shift solenoid valve 53 are all off, and the hydraulic pressure in the lines 137 and 161 is zero. Accordingly, also the hydraulic pressure imparted to the applying side 45A of the second brake actuator 45 is zero. When the pressure on the applying side 45A and the pressure on the releasing side 45B are equal to each other as in this case, the actuator 45 keeps the second brake 19 released. The second brake 19 is thus kept released when the transmission is in first.

When the 1-2 shift solenoid valve 51 is turned on to cause the transmission to upshift to second in this state, the timing control solenoid valve 47 is turned on under the control of the control signal A5, whereby the drain line 117 is closed to establish the pilot pressure in the line 163. Under the pilot pressure in the line 163, the spool 73a of the 3-2 timing valve 73 is moved rightward overcoming the force of the spring 73d, and the communications between the lines 137 and 137' and between the lines 171 and 172 are broken. Further, the 1-2 shift solenoid valve 51 is turned on and accordingly the 1-2 shift valve 63 is actuated to apply the line pressure to the line 161. Since the communication between the lines 171 and 172 is broken at this time, the line pressure applied to the line 161 is applied to the engaging side 45A of the second brake actuator 45 through the one-way orifice 82. Since the applying side 45A is communicated with the accumulator 79, the hydraulic pressure in the applying side 45A is gradually increased and the second brake 19 is gently engaged, thereby preventing occurrence of shock upon upshift from first to second. Though the communication between the lines 137 and 137' is broken, the hydraulic pressure in the releasing side 45B of the actuator 45 is kept at zero since the line 138 is communicated with the drain when the transmission is in second.

Now the operation of the second brake 19 upon downshift from third to second will be described. When the transmission is in third, the timing control solenoid valve 47 is on under the control of the control signal A5, and the spool 73a of the 3-2 timing valve 73 is held in the right position under the line pressure in the line 163. Further, the 1-2 shift solenoid valve 51 and the 2-3 shift solenoid valve 52 are on while the 3-4 shift solenoid valve 53 is off, and the line pressure is applied to both the lines 137 and 161. Accordingly, the line pressure is imparted to both the applying side 45A and the releasing side 45B of the second brake actuator 45. That is, the pressures in the applying side 45A and the releasing side 45B are equal to each other, and accordingly the second brake 19 is kept released.

When the 2-3 shift solenoid valve is turned off to cause the transmission to downshift to second in this state, the 2-3 shift valve 64 is driven to communicate the line 138 with the drain. At the same time, the timing control solenoid valve 47 is turned off under the control of the control signal A5, the hydraulic pressure in the line 163 is nullified, and the spool 73a of the 3-2 timing valve 73 is moved leftward under the force of the spring 73d. When the spool 73a is moved leftward, the lines 137 and 137' are communicated with each other so that the releasing side 45B of the second brake actuator 45 is directly communicated with the drain to abruptly nullify the hydraulic pressure in the releasing side 45B. At the same time, the lines 171 and 172 are communicated with each other and the line pressure applied to the line 161 is applied to the applying side 45A of the second brake actuator 45 not only by way of the one-way orifice 82 but also by way of the lines 171 and 172 bypassing the one-way orifice 82. Accordingly, discharge of the hydraulic pressure from the releasing side 45B and application of the hydraulic pressure to the applying side 45A can be quickly effected, whereby delay in the engaging timing of the second brake upon downshift from third to second can be prevented.

We claim:

1. An automatic transmission control system for controlling an automatic transmission comprising a torque convertor having an input member connected to the engine output shaft and an output member connected to a multiple stage transmission gear mechanism adapted to provide a plurality of gear speeds, and a shifting means for shifting the gear speed, the shifting means having a plurality of frictional members, a plurality of hydraulic actuators for actuating the frictional members and a plurality of valve means which are controlled according to the vehicle operating condition to control application of hydraulic pressure from a hydraulic pressure source to the hydraulic actuators, said shifting means being adapted to shift the gear speed at least among a low gear speed, an intermediate gear speed and a high gear speed, a predetermined one frictional member out of said plurality of frictional members being released in the low gear speed and the high gear speed and engaged in the intermediate gear speed, and the predetermined one frictional member being engaged and released by a predetermined one hydraulic actuator out of said plurality of hydraulic actuators, wherein the improvement comprises a first control means which limits application of the hydraulic pressure to said predetermined one hydraulic actuator so that the hydraulic pressure is gently applied to the predetermined one hydraulic actuator upon upshift from the low gear speed to the intermediate gear speed, and a second control means which operates upon downshift from the high gear speed to the intermediate gear speed to nullify the limitation of application of the hydraulic pressure to said predetermined one hydraulic actuator.

2. An automatic transmission control system as defined in claim 1 in which said first control means comprises a constriction provided in an oil passage for supplying the hydraulic pressure to said predetermined one hydraulic actuator, and said second control means comprises a bypass passage provided to bypass the constriction.

3. An automatic transmission control system as defined in claim 2 in which said first control means further comprises an accumulator provided in the oil passage between said constriction and said predetermined one hydraulic actuator.

4. An automatic transmission control system as defined in claim 2 in which said second control means further comprises an on-off valve provided in said bypass passage.

5. An automatic transmission control system as defined in claim 2 in which said predetermined one hydraulic actuator comprises a piston for actuating said predetermined one frictional member, an applying side pressure chamber for driving the piston to engage the predetermined one frictional member and a releasing side pressure chamber for driving the piston to release the same, and said constriction is provided in the oil passage for supplying the hydraulic pressure to the applying side pressure chamber.

6. An automatic transmission control system as defined in claim 5 in which said releasing side pressure chamber is provided with a timing valve to which the hydraulic pressure is supplied together with the hydraulic actuator for another frictional member to be engaged to shift the gear speed to the high gear speed, and which directly drains the hydraulic pressure from the releasing side pressure chamber, and said second control means further comprises an on-off valve which opens and closes said bypass passage in response to operation of the timing valve.

7. An automatic transmission control system as defined in claim 6 in which said on-off valve is formed integrally with the valve spool of the timing valve, and the valve is displaced at a predetermined time upon downshift from the high gear speed to the intermediate gear speed to directly drain the hydraulic pressure from the releasing side pressure chamber and to open the bypass passage.

8. An automatic transmission control system for controlling an automatic transmission comprising a torque convertor having an input member connected to the engine output shaft and an output member connected to a multiple stage transmission gear mechanism adapted to provide a plurality of gear speeds, and a shifting means for shifting the gear speed, the shifting means having a plurality of frictional members, a plurality of hydraulic actuators for actuating the frictional members and a plurality of valve means which are controlled according to the vehicle operating condition to control application of hydraulic pressure from a hydraulic pressure source to the hydraulic actuators, said shifting means being adapted to shift the gear speed at least among a low gear speed, an intermediate gear speed and a high gear speed, a predetermined one frictional member out of said plurality of frictional members being released in the low gear speed and the high gear speed and engaged in the intermediate gear speed, and the predetermined one frictional member being engaged and released by a predetermined one hydraulic actuator out of said plurality of hydraulic actuators, wherein the improvement comprises said predetermined one hydraulic actuator comprising a piston for actuating said predetermined one frictional member, an applying side pressure chamber for driving the piston to engage the predetermined one frictional member and a releasing side pressure chamber for driving the piston to release the same, a constriction in the oil passage for supplying the hydraulic pressure to the applying side pressure chamber, and means actuated upon downshift from the high gear speed to the intermediate gear speed to nullify the effect of the constriction.

9. An automatic transmission control system for controlling an automatic transmission comprising a torque convertor having an input member connected to the engine output shaft and an output member connected to a multiple stage transmission gear mechanism adapted to provide a plurality of gear speeds, and a shifting means for shifting the gear speed, the shifting means having a plurality of frictional members, a plurality of hydraulic actuators for actuating the frictional members and a plurality of valve means which are controlled according to the vehicle operating condition to control application of hydraulic pressure from a hydraulic pressure source to the hydraulic actuators, said shifting means being adapted to shift the gear speed among first, second and third, a second brake out of said plurality of frictional members being released in first and third and engaged in second, and the second brake being engaged and released by a second brake actuator out of said plurality of hydraulic actuators, wherein the improvement comprises a first control means which limits application of the hydraulic pressure to said second brake actuator so that the hydraulic pressure is gently applied to the second brake actuator upon upshift from first to second, and a second control means which operates upon downshift from third to second to nullify the limitation of application of the hydraulic pressure to said second brake actuator, said second brake actuator comprising a piston for actuating said second brake, an applying side pressure chamber for driving the piston to engage the second brake and a releasing side pressure chamber for driving the piston to release the same, and said second control means comprising a constriction provided in the oil passage for supplying the hydraulic pressure to the applying side pressure chamber, said releasing side pressure chamber is provided with a 3-2 timing valve to which the hydraulic pressure is supplied together with the hydraulic actuator for the front clutch to be engaged to shift the gear speed to first, and which directly drains the hydraulic pressure from the releasing side pressure chamber, and said second control means further comprises an on-off valve which opens and closes said bypass passage in response to operation of the 3-2 timing valve.

10. An automatic transmission control system for controlling an automatic transmission comprising a torque convertor having an input member connected to the engine output shaft and an output member connected to a multiple stage transmission gear mechanism adapted to provide a plurality of gear speeds, and a shifting means for shifting the gear speed, the shifting means having a plurality of frictional members, a plurality of hydraulic actuators for actuating the frictional members and a plurality of valve means which are controlled according to the vehicle operating condition to control application of hydraulic pressure from a hydraulic pressure source to the hydraulic actuators, said shifting means being adapted to shift the gear speed at least among a low gear speed, an intermediate gear speed and a high gear speed, a predetermined one frictional member out of said plurality of frictional members being released in the low gear speed and the high gear speed and engaged in the intermediate gear speed, and the predetermined one frictional member being engaged and released by a predetermined one hydraulic actuator out of said plurality of hydraulic actuators, wherein the improvement comprises a first control means which limits application of the hydraulic pressure to said predetermined one hydraulic actuator so that the hydraulic pressure is gently applied to the predetermined one hydraulic actuator upon upshift from the low gear speed to the intermediate gear speed, and a second control means which operates upon downshift from the high gear speed to the intermediate gear speed to rapidly supply the hydraulic pressure to said predetermined one hydraulic actuator.

* * * * *